(12) United States Patent
Lee et al.

(10) Patent No.: US 9,516,140 B2
(45) Date of Patent: Dec. 6, 2016

(54) BROADCAST RECEIVING APPARATUS, SERVER, METHOD FOR CONTROLLING THE BROADCAST RECEIVING APPARATUS, AND METHOD FOR CONTROLLING THE SERVER

(71) Applicant: SAMSUNG ELECTRONICS CO., LTD., Suwon-si (KR)

(72) Inventors: Jae-hwang Lee, Seoul (KR); Ji-won Park, Incheon (KR); Jin-hyuck Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 271 days.

(21) Appl. No.: 13/709,332

(22) Filed: Dec. 10, 2012

(65) Prior Publication Data

US 2013/0151591 A1 Jun. 13, 2013

(30) Foreign Application Priority Data

Dec. 9, 2011 (KR) ........................ 10-2011-0132123

(51) Int. Cl.
*G06F 15/16* (2006.01)
*H04L 29/06* (2006.01)
*H04N 21/254* (2011.01)
*H04N 21/258* (2011.01)
*H04N 21/658* (2011.01)

(52) U.S. Cl.
CPC ............ *H04L 67/42* (2013.01); *H04N 21/254* (2013.01); *H04N 21/25866* (2013.01); *H04N 21/658* (2013.01); *H04N 21/6581* (2013.01); *H04N 21/6582* (2013.01)

(58) Field of Classification Search
CPC ...... G06F 17/30; H04L 41/0803; H04L 41/22; H04L 67/42; H04N 21/254; H04N 21/25866; H04N 21/658; H04N 21/6581; H04N 21/6582
USPC .......................... 709/202, 217, 219; 790/203
See application file for complete search history.

(56) References Cited

U.S. PATENT DOCUMENTS

| | | | |
|---|---|---|---|
| 7,287,062 B2 | 10/2007 | Im et al. | |
| 8,528,016 B2 * | 9/2013 | Aldrey et al. | 725/40 |
| 2002/0151327 A1 * | 10/2002 | Levitt | 455/556 |
| 2004/0111490 A1 | 6/2004 | Im et al. | |
| 2005/0097618 A1 | 5/2005 | Arling et al. | |
| 2008/0225184 A1 * | 9/2008 | Hardacker et al. | 348/734 |
| 2009/0006583 A1 | 1/2009 | Kindle et al. | |
| 2009/0064261 A1 | 3/2009 | Jung | |

(Continued)

FOREIGN PATENT DOCUMENTS

KR 10-2004-0049667 A 6/2004

OTHER PUBLICATIONS

Communication, dated May 20, 2014, issued by the European Patent Office in counterpart European Application No. 12193932.6.

*Primary Examiner* — Jonathan Bui
(74) *Attorney, Agent, or Firm* — Sughrue Mion, PLLC

(57) ABSTRACT

A broadcast receiving apparatus is provided, which includes an interface unit connected to a server; a storage unit storing information on the broadcast receiving apparatus, a display unit displaying a UI (User Interface) for selecting the information on the broadcast receiving apparatus, and a control unit controlling the interface unit to transfer the information on the broadcast receiving apparatus selected through the UI to the server.

16 Claims, 17 Drawing Sheets

(56) References Cited

U.S. PATENT DOCUMENTS

2009/0172419 A1*   7/2009  Takayama ..................... 713/193
2009/0282133 A1*  11/2009  Walker et al. ................ 709/221
2009/0292375 A1*  11/2009  Thompson et al. ............ 700/81
2011/0302619 A1*  12/2011  Hale et al. .................... 725/110
2012/0254119 A1   10/2012  Kumarasamy et al. ...... 707/646
2013/0101113 A1*   4/2013  Cannon et al. ................ 380/44

* cited by examiner

FIG. 4

```xml
<?xml version="1.0" encoding="UTF-8" ?>
- <rm_as version="2.0">
  - <as_info devicetype="TV">
    - <menu name="picture">
        <property name="Mode" value="1" default="1" />
        <property name="Backlight" value="13" />
        <property name="Contrast" value="100" />
        <property name="Brightness" value="45" />
        <property name="Sharpness" value="50" />
        <property name="Color" value="50" />
        <property name="Tint" value="50" />
      - <property name="Tint" value="50" />
          <property name="Size" value="0" />
        </property>
      - <property name="3D">
          <property name="3D Mode" value="0" default="0" />
        </property>
      - <property name="Option">
          <property name="Color_Tone" value="2" />
          <property name="Digital_Noise_Filter" value="4" />
          <property name="MPEG_Noise_Filter" value="4" />
          <property name="HDMI_Black_Level" value="0" />
          <property name="Film_Mode" value="0" />
        </property>
      </menu>
    + <menu name="Sound">
    + <menu name="Channel">
    + <menu name="Network">
    + <menu name="System">
    + <menu name="Input">
    + <menu name="SetInformation">
    + <menu name="Factory">
    + <menu name="SystemInformation">
    </as_info>
  - <dictionary>
    + <! [CDATA [] ] >
    </dictionary>
  </rm_as>
```

300

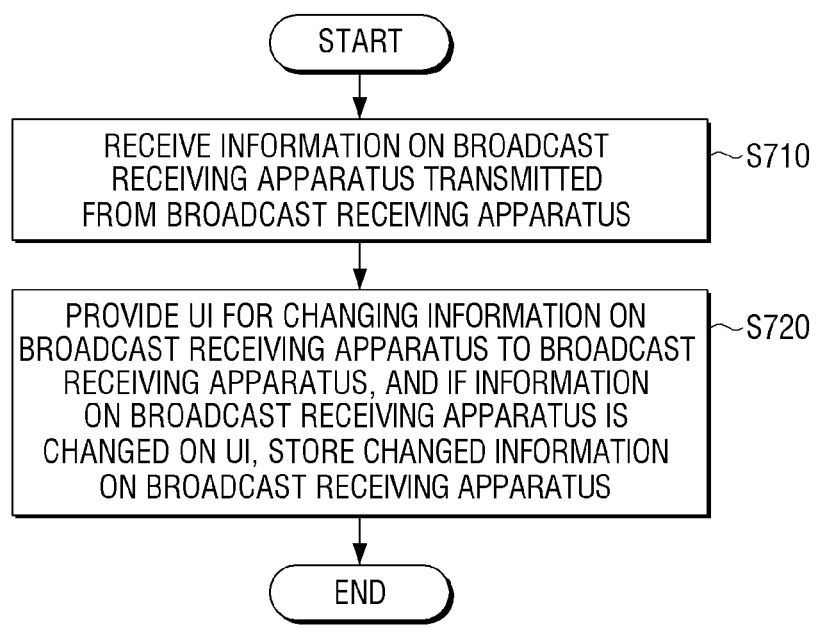

BROADCAST RECEIVING APPARATUS, SERVER, METHOD FOR CONTROLLING THE BROADCAST RECEIVING APPARATUS, AND METHOD FOR CONTROLLING THE SERVER

CROSS-REFERENCE TO RELATED APPLICATIONS

This application claims benefit under 35 U.S.C. §119(a) to Korean Patent Application No. 10-2011-0132123, filed on Dec. 9, 2011, in the Korean Intellectual Property Office, the disclosure of which is incorporated herein by reference.

BACKGROUND

1. Field

The exemplary embodiments relate generally to a broadcast receiving apparatus, a server, a method for controlling the broadcast receiving apparatus, and a method for controlling the server, and more particularly to a broadcast receiving apparatus, a server, a method for controlling the broadcast receiving apparatus, and a method for controlling the server, which can back up and restore information on the broadcast receiving apparatus.

2. Description of the Related Art

In general, a broadcast receiving apparatus means a device which outputs a broadcasting signal that is received over the air or from cables, and a representative example thereof may be a TV.

The TV operates according to set environmental information, and users set their desired environmental information on the TV in order to view broadcasting programs more vividly and realistically.

However, a general TV does not support a function of storing and restoring environmental information that is set differently from a portable multimedia device.

Accordingly, if the environmental information set by a user is lost for reasons, such as replacement of the TV itself due to trouble or initialization of the TV for upgrade, the previously set values may not be automatically restored.

Accordingly, it is necessary to seek schemes for restoring the environmental information set in the broadcast receiving apparatus such as the TV.

SUMMARY

The exemplary embodiments have been made to address at least the above problems and/or disadvantages and to provide at least the advantages described below. Accordingly, an aspect of an exemplary embodiment provides a broadcast receiving apparatus, a server, a method for controlling the broadcast receiving apparatus, and a method for controlling the server, which can easily back up and restore information on the broadcast receiving apparatus.

According to one aspect of an exemplary embodiment, a broadcast receiving apparatus includes an interface unit connected to a server; a storage unit storing information on the broadcast receiving apparatus; a display unit displaying a UI (User Interface) for selecting the information on the broadcast receiving apparatus; and a control unit controlling the interface unit to transfer the information on the broadcast receiving apparatus selected through the UI to the server.

In this case, the information on the broadcast receiving apparatus may include at least one of setting information on the broadcast receiving apparatus and user information stored in the broadcast receiving apparatus.

The control unit may convert the selected information on the broadcast receiving apparatus in an XML (Extensible Markup Language) form to transmit the converted information to the server.

The interface unit may be connected to an external device, and the control unit may transmit the selected information of the broadcast receiving apparatus to the external device that is connected to the server in order to transmit the selected information on the broadcast receiving apparatus to the server.

The control unit may encrypt the selected information on the broadcast receiving apparatus with a predetermined key and transmit the encrypted information to the server.

On the other hand, the control unit may transmit a command for requesting the information on the broadcast receiving apparatus to the server through the interface unit, receive and store the information on the broadcast receiving apparatus from the server in response to the request command.

According to another aspect of an exemplary embodiment, a server includes an interface unit connected to a broadcast receiving apparatus; a storage unit storing information on the broadcast receiving apparatus that is transmitted from the broadcast receiving apparatus; and a control unit providing a UI for changing the information on the broadcast receiving apparatus to the broadcast receiving apparatus and storing the changed information on the broadcast receiving apparatus in the storage unit if the information on the broadcast receiving apparatus is changed on the UI.

In this case, the control unit may receive and store the information on the broadcast receiving apparatus that is expressed in an XML (Extensible Markup Language) form through the interface unit.

The information on the broadcast receiving apparatus may include setting information on the broadcast receiving apparatus, and the control unit may change the setting information to correspond to a set environment of another broadcast receiving apparatus and transmit the changed setting information to the other broadcast receiving apparatus if a command for requesting transmission of the stored information on the broadcast receiving apparatus is received from the other broadcast receiving apparatus.

According to still another aspect of an exemplary embodiment, a method for controlling a broadcast receiving apparatus that is connected to a server includes displaying a UI (User Interface) for selecting information on the broadcast receiving apparatus; and transmitting the information on the broadcast receiving apparatus selected through the UI to the server.

In this case, the information on the broadcast receiving apparatus may include at least one of setting information on the broadcast receiving apparatus and user information stored in the broadcast receiving apparatus.

The transmitting the information to the server may convert the selected information on the broadcast receiving apparatus in an XML (Extensible Markup Language) form to transmit the converted information to the server.

The broadcast receiving apparatus may be connected to an external device, and the method for controlling a broadcast receiving apparatus according to the aspect of an exemplary embodiment may further include transmitting the selected information of the broadcast receiving apparatus to the external device that is connected to the server in order to transmit the selected information on the broadcast receiving apparatus to the server.

The transmitting the information to the server may encrypt the selected information on the broadcast receiving apparatus with a predetermined key and transmit the encrypted information to the server.

The method for controlling a broadcast receiving apparatus according to the aspect of an exemplary embodiment may further includes transmitting a command for requesting the information on the broadcast receiving apparatus to the server; and receiving and storing the information on the broadcast receiving apparatus from the server in response to the request command.

According to still another aspect of an exemplary embodiment, a method for controlling a server that is connected to a broadcast receiving apparatus includes receiving information on the broadcast receiving apparatus that is transmitted from the broadcast receiving apparatus; and providing a UI for changing the information on the broadcast receiving apparatus to the broadcast receiving apparatus and storing the changed information on the broadcast receiving apparatus if the information on the broadcast receiving apparatus is changed on the UI.

The receiving information on the broadcast receiving apparatus may receive and store the information on the broadcast receiving apparatus that is expressed in an XML (Extensible Markup Language) form.

In this case, the information on the broadcast receiving apparatus may include setting information on the broadcast receiving apparatus, and the method for controlling a server according to the aspect of an exemplary embodiment may further include receiving a command for requesting transmission of the stored information on the broadcast receiving apparatus from another broadcast receiving apparatus; and changing the setting information to correspond to a set environment of the other broadcast receiving apparatus and transmitting the changed setting information to the other broadcast receiving apparatus.

As described above, according to diverse exemplary embodiments, the information on the broadcast receiving apparatus can be transmitted to the server. Accordingly, even in the case where the information on the broadcasting apparatus is initialized and the previously stored information is lost due to an upgrade, resetting of the broadcast receiving apparatus, or the broadcast receiving apparatus itself being replaced, the previously used information on the broadcast receiving apparatus can be easily restored and used.

BRIEF DESCRIPTION OF THE DRAWINGS

The above and other aspects, features and advantages of exemplary embodiments will be more apparent from the following detailed description when taken in conjunction with the accompanying drawings, in which:

FIG. 4 is a diagram illustrating information on a broadcast receiving apparatus converted into an XML form according to an exemplary embodiment;

FIG. 17 is a flowchart illustrating a method for controlling a server that is connected to a broadcast receiving apparatus according to an exemplary embodiment.

DETAILED DESCRIPTION OF EXEMPLARY EMBODIMENTS

Hereinafter, exemplary embodiments are described in detail with reference to the accompanying drawings.

Figure 1:
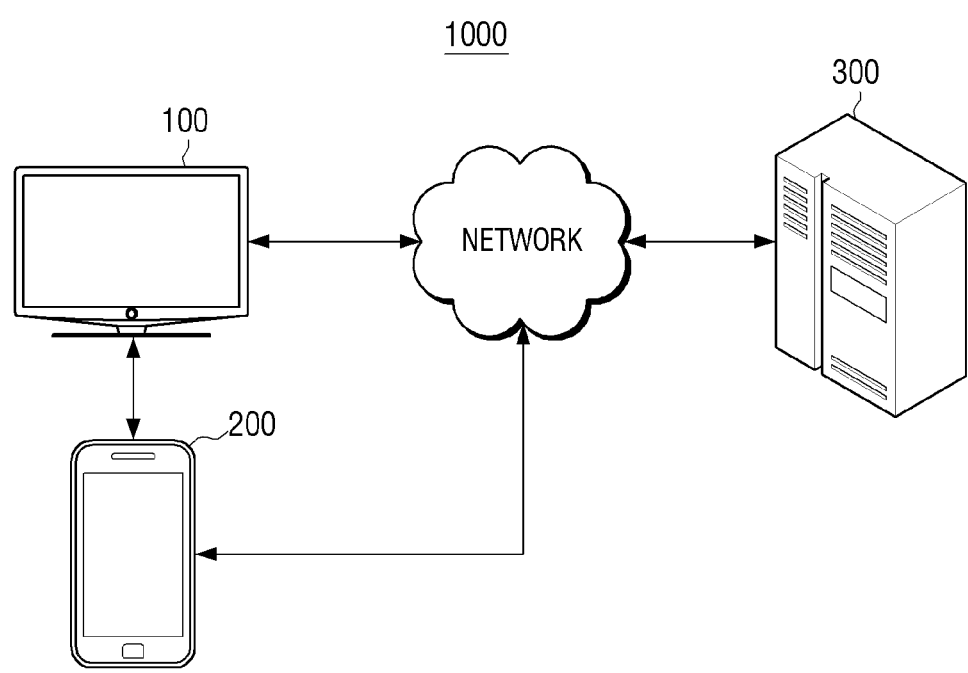
FIG. 1 is a diagram illustrating a system for transmitting and receiving information on a broadcast receiving apparatus according to an exemplary embodiment.

FIG. 1 is a diagram illustrating a system for transmitting and receiving information on a broadcast receiving apparatus according to an exemplary embodiment. As illustrated in FIG. 1, a system 1000 according to an exemplary embodiment includes a broadcast receiving apparatus 100, an external device 200, and a server 300.

The broadcast receiving apparatus 100 may transmit information on the broadcast receiving apparatus 100 to the server 300. Here, the information on the broadcast receiving apparatus includes setting information on the broadcast receiving apparatus or user information stored in the broadcast receiving apparatus, or both.

Specifically, the broadcast receiving apparatus 100 may be connected to the server 300 through a network such as the Internet and may directly transmit the information on the broadcast receiving apparatus to the server 300.

On the other hand, the broadcast receiving apparatus 100 may transmit the information on the broadcast receiving apparatus to the external device 200 through a network such as the Internet in order to transmit the information on the broadcast receiving apparatus to the server.

On the other hand, the broadcast receiving apparatus 100 may transmit the information on the broadcast receiving apparatus to the external device 200, and may temporarily store the information on the broadcast receiving apparatus in the external device 200.

In an exemplary embodiment, the broadcast receiving apparatus 100 may transmit the information on the broadcast receiving apparatus directly to the external device 200 through wired or wireless connection, and may temporarily store the information on the broadcast receiving apparatus in the external device 200.

Then, the broadcast receiving apparatus 100 may transmit a command for requesting the information on the broadcast receiving apparatus to the external device 200 or the server 300, and may receive and store the information on the broadcast receiving apparatus in response to the request command.

Further, the broadcast receiving apparatus 100 may perform the operation according to the information on the broadcast receiving apparatus that is received from the server 300 or the external device 200.

The broadcast receiving apparatus 100 that performs such functions may be a digital TV, but is not limited thereto. That is, any electronic device that can receive and output a broadcasting signal may be the broadcast receiving apparatus 100 according to an exemplary embodiment.

The external device 200 may receive the information on the broadcast receiving apparatus from the broadcast receiving apparatus 100 to transmit the received information to the server 300, and may receive the information on the broadcast receiving apparatus from the server 300 to re-transfer the received information to the broadcast receiving apparatus 100. In this case, the external device 200 may request transmission of the information on the broadcast receiving apparatus from the server 300 based on the the request command received from the broadcast receiving apparatus 100.

The external device 200 having the above-described function may be implemented by a digital TV, a notebook computer, a mobile terminal, an MP3 player, a PMP (Portable Multimedia Player), or the like, which is connected to the server 300 through the Internet or the like.

If the external device 200 is not connected to the server 300, the external device 200 may store the information on the broadcast receiving apparatus that is received from the broadcast receiving apparatus 100 and may transmit the stored information on the broadcast receiving apparatus to the broadcast receiving apparatus 100 in response to the request. For this, the external device 200 may include a nonvolatile memory, such as a flash memory, a FRAM (Ferroelectric Random Access Memory), a PRAM (Phase-change Random Access Memory), or the like, or may be implemented by a USB memory or the like.

The server 300 stores the information on the broadcast receiving apparatus that is transmitted from the broadcast receiving apparatus 100 or the external device 200. Further, the server 300 may transmit the stored information on the broadcast receiving apparatus to the broadcast receiving apparatus 100 or the external server 200 in response to the request.

According to diverse exemplary embodiments as described above, even in the case where the information on the broadcasting apparatus is initialized and the previously stored information is lost due to software upgrade, resetting of the broadcast receiving apparatus, or the broadcast receiving apparatus itself being replaced, the previously used information on the broadcast receiving apparatus can be easily restored and used.

Figure 2:
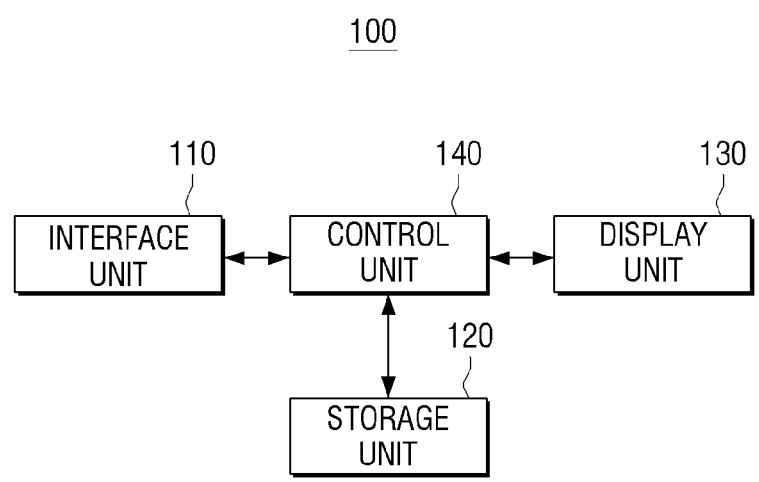
FIG. 2 is a block diagram illustrating the configuration of a broadcast receiving apparatus according to an exemplary embodiment.

FIG. 2 is a block diagram illustrating the configuration of a broadcast receiving apparatus according to an exemplary embodiment. As illustrated in FIG. 2, the broadcast receiving apparatus 100 includes an interface unit 110, a storage unit 120, a display unit 130, and a control unit 140.

The interface unit 110 is connected to the server. In an exemplary embodiment, the interface unit 110 may be an interface. Specifically, the interface unit 110 is provided with a network adaptor and may be connected to the server through a network such as the Internet.

Further, the interface unit 110 may be connected to the external device 200 by wire or wirelessly. Specifically, the interface unit 110 may be provided with a D-Sub port, a DVI port, a High Definition Multimedia Interface (HDMI) port, or the like, or may be connected to the external device 200 through a wireless system, such as Bluetooth (BT), Wireless Fidelity (Wi-fi), Zigbee, and the like.

The storage unit 120 is a storage medium in which various kinds of programs that are necessary to operate the broadcast receiving apparatus 100 are stored. In an exemplary embodiment, the storage unit 120 is a storage. The storage unit 120 may be implemented by a volatile memory in which stored data is erased when power supply is interrupted, such as a Dynamic Random Access Memory (DRAM) or a Static Random Access Memory (SRAM), and a nonvolatile memory in which stored data is not erased even when the power supply is interrupted, such as a flash memory, a Ferroelectric Random Access Memory (FRAM), or a Phase-change Random Access Memory (PRAM), and may permanently or temporarily store programs for performing the operation of the broadcast receiving apparatus 100.

In particular, the storage unit 120 may store the information on the broadcast receiving apparatus. Here, the information on the broadcast receiving apparatus includes setting information on the broadcast receiving apparatus or user information stored in the broadcast receiving apparatus, or both.

Specifically, the information on the broadcast receiving apparatus means system setting information of the broadcast receiving apparatus, such as display setting, sound setting, channel selection, network setting, or other settings. Further, the user information stored in the broadcast receiving apparatus means user setting information that is directly input by a user, such as account information, timer information, or other pieces of information input by the user.

The display unit 130 displays a User Interface (UI) for selecting the information on the broadcast receiving apparatus.

Specifically, the display unit 130 displays the UI for selecting the information on the broadcast receiving apparatus, which is transmitted to or received from the external device 200 or the server 300. For this, description will be made later with reference to accompanying FIG. 3.

On the other hand, the display unit 130 that performs such a function may include a display panel that is implemented in the form of a liquid crystal display (LCD), an organic light emitting display (OLED), plasma display panel (PDP), or the like, and a panel driving unit that drives the display panel.

Further, the display unit 130 may sense a user's touch input. Specifically, the display unit 130 may recognize a touch input by a user's finger or a stylus pen using touch sensors arranged on the front surface thereof and may transfer the input touch information to the control unit 140 to be described later.

Here, the touch information includes information on touch types, such as touch-down, touch-up, tap, and the like, and information on the position on which the corresponding touch occurs.

The control unit 140 controls the whole operation of the broadcast receiving apparatus. In an exemplary embodiment, the control unit 140 may be a controller or a processor. In particular, the control unit 140 determines the information on the broadcast receiving apparatus that is selected on the UI based on a user command input through an input unit (not illustrated) or touch information transferred from the display unit 130.

Further, the control unit 140, in order to transmit the information on the broadcast receiving apparatus that is selected through the UI to the server 300, may control the interface unit 110 to transmit the selected information on the broadcast receiving apparatus to the external device 200 connected to the server 300.

For example, if it is determined that display environment setting information and Social Networking Service (SNS) account information are selected on the UI according to the user command, the control unit 140 may transmit the display environment setting information (for example, "Brightness:

65, Contrast: 50") and the SNS account information (for example, ID and Password) to the external device 200 or the server 300.

Here, a command for transmitting the information on the broadcast receiving apparatus may be input through the UI that is displayed on the display unit 130 or a separate button provided on the input unit (not illustrated).

On the other hand, the control unit 140 may convert the selected information on the broadcast receiving apparatus into an Extensible Markup Language (XML) form to transmit the converted information to the server. For this, the control unit 140 may include an XML generator, and an example of the information on the broadcast receiving apparatus that is converted into the XML form will be described later with reference to FIG. 4.

On the other hand, the control unit 140 may encrypt the information on the broadcast receiving apparatus, which is selected through the UI, with a predetermined key and may transmit the encrypted information to the external device 200 and the server 300.

For this, the control unit 140 includes an encryption module, and may encrypt the information on the broadcast receiving apparatus using an encryption key that is known between the external device 200 and the server 300 to transmit the encrypted information to the external device 200 and the server 300. In this case, the encryption module may use an encryption method such as a private key encryption system (DES), and since such an encryption method is already known, the detailed description thereof will be omitted.

On the other hand, the control unit may transmit a command for requesting the information on the broadcast receiving apparatus to the server 300 through the interface unit 110, receive and store the information on the broadcast receiving apparatus from the server 300 in response to the request command. Here, the request for the information on the broadcast receiving apparatus may be input through the UI that is displayed on the display unit 130 or through a separate button that is provided on the input unit (not illustrated).

Further, the control unit 140 may control the operation of the broadcast receiving apparatus 100 based on the information on the broadcast receiving apparatus that is stored in the storage unit 120.

For example, if "Brightness: 65, Contrast: 50" is received from the external device 200 or the server 300 as the display environment setting information, the control unit 140 may control the display unit 130 so that a screen of the display unit 130 has "Brightness: 65, Contrast: 50".

As another example, if "ID and Password" is received from the external device 200 or the server as the SNS account information, the control unit 140 stores the received ID and password. Then, if a login command of the corresponding SNS is input from the user, the control unit 140 may use the pre-stored ID and password to connect to the corresponding SNS.

On the other hand, the broadcast receiving apparatus according to an exemplary embodiment may further include an input unit (not illustrated), a receiving unit (not illustrated), a signal separation unit (not illustrated), and an A/V processing unit (not illustrated) in addition to the configuration as illustrated in FIG. 1.

The input unit (not illustrated) receives a user command. In particular, the input unit (not illustrated) may be provided with direction buttons and a selection button for operating a highlight or cursor that is displayed on the UI. Through this, the user may input a command for selecting the information on the broadcast receiving apparatus that is displayed on the UI, a command for transmitting the selected information to the external device 200 and the server 300, and a command for requesting transmission of the selected information from the external device 200 and the server 300. The input unit that performs such functions may be implemented by a touch screen, a touch pad, a key button, or a keypad, or may be implemented to receive user commands input from a remote control device (not illustrated) such as a remote controller. In addition to the user commands for selecting the information on the broadcast receiving apparatus, the input unit may receive diverse user commands for controlling the broadcast receiving apparatus 100, such as a channel selection command, a volume adjustment command, a record command, and the like, on the UI.

The receiving unit (not illustrated) receives broadcasting signals through a plurality of channels. Specifically, the receiving unit receives broadcasting signals from broadcasting stations, a satellite, or an external input device by wire or wirelessly and demodulates the received broadcasting signals.

For example, the receiving unit may be a tuner for receiving the broadcasting signals, or an A/V interface for receiving an input of images from the external input device. Further, according to circumstances, the receiving unit may be provided with a plurality of tuners and may receive the broadcasting signals simultaneously from a plurality of channels.

The signal separation unit (not illustrated) separates the broadcasting signal into a video signal, an audio signal, and broadcasting information. Here, the broadcasting information may include an Electronic Programming Guide (EPG) for each channel, and the EPG may include a title of broadcasting content, a broadcasting channel, a channel name, a broadcasting time, simple information of the broadcasting content, and the like.

The A/V processing unit (not illustrated) performs signal processing, such as video decoding, video scaling, and audio decoding, with respect to the video signal and the audio signal input from the signal separation unit so that the processed signals can be output through the display unit 130 and an audio output unit (not illustrated).

Figure 3:
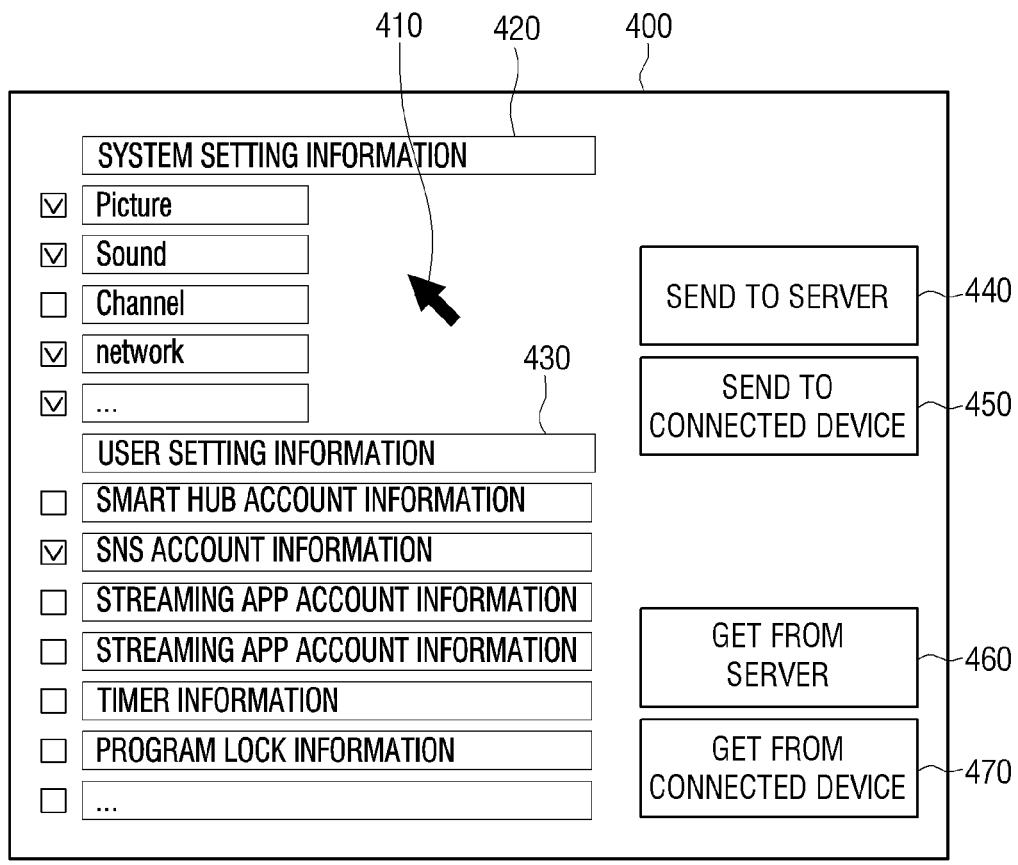
FIG. 3 is a diagram illustrating a UI for selecting information on a broadcast receiving apparatus according to an exemplary embodiment.

FIG. 3 is a diagram illustrating a UI for selecting the information on the broadcast receiving apparatus according to an exemplary embodiment.

As illustrated in FIG. 3, on the UI 400, a list of setting information (that is, "system setting information") 420 on the broadcast receiving apparatus and user information (that is, "user setting information") 430 that is stored in the broadcast receiving apparatus is displayed. The user may select the setting information and the user information on the UI 400 by controlling a cursor 410 through the input unit (not illustrated) or directly touching the corresponding list on the UI 400.

Further, the user may transmit the information selected through a menu item that is provided on the UI 400 to a device designated by the user, or may request the transmitted information from the corresponding device.

For example, as illustrated in FIG. 3, if the user selects "Send to server" 440 after selecting Picture, Sound, and Network from the system setting information 420 and selecting SNS account information from the user setting information 430, the setting information on "Picture", "Sound", and "Network" and the SNS account information can be transmitted to the server 300. On the other hand, if the user selects "Send to connected device" 450, the setting information on "Picture", "Sound", and "Network" and the SNS account information can be transmitted to the external device 200.

As another example, as illustrated in FIG. 3, if the user selects "Get from server" 460 after selecting "Picture", "Sound", and "Network" from the system setting information 420 and selecting the SNS account information from the user setting information 430, the transmission of the setting information for "Picture", "Sound", and "Network" and the SNS account information can be requested from the server 300. On the other hand, if the user selects "Get from connected device" 470, the transmission of the setting information for "Picture", "Sound", and "Network" and the SNS account information can be requested from the external device 200.

As described above, according to an exemplary embodiment, the whole or a part of the information on the broadcast receiving apparatus can be selected and transmitted to the external device 200 or the server 300 and the transmission thereof can be requested from the external device 200 or the server 300 on the point that the UI for selecting the information on the broadcast receiving apparatus is provided.

In the above-described exemplary embodiment, menu icons 440 and 450 for transmitting the selected information and menu icons 460 and 470 for requesting the transmission of the selected information are displayed together. However, this is merely exemplary, and it is also possible to separately display them on the UI that includes the list of the system setting information and the user setting information.

The menu icons 450 and 470 for the external device may be displayed in diverse manners according to the type of the external device connected to the broadcast receiving apparatus 100. Specifically, the control unit 140 may determine the type of the external device that is connected to the broadcast receiving apparatus 100 according to the plug and play function and may display the menu icons 450 and 470 for the external device with an icon shape that corresponds to the title of the external device or the shape of the external device.

For example, if "USB memory" is connected to the broadcast receiving apparatus 100, the menu icons 450 and 470 may be displayed as "Send to USB memory" and "Get from USB memory", respectively. For example, if "Mobile terminal device" and "USB memory" are connected to the broadcast receiving apparatus 100, the menu icon 450 may be displayed as "Send to Mobile terminal device" and "Send to USB memory", and the menu icon 470 may be displayed as "Get from Mobile terminal device" and "Get from USB memory".

FIG. 4 is a diagram illustrating information on a broadcast receiving apparatus converted into an XML form according to an exemplary embodiment.

That is, according to an exemplary embodiment, the information on the broadcast receiving apparatus that is transmitted to the external device 200 or the server 300 may be converted into an XML form to be transmitted. For example, as illustrated in FIG. 4, the display environment setting information ("Picture") and the audio environment setting information ("Sound") may be converted into the XML form to be transmitted to the external device 200 or the server 300.

In the same manner, even in the case where the server 300 transmits the stored information on the broadcast receiving apparatus 100 in response to the request of the broadcast receiving apparatus 100, the information can be transmitted in the XML form as illustrated in FIG. 4.

Figure 5:
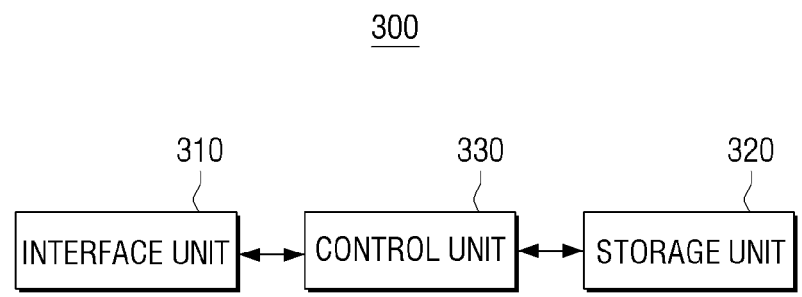
FIG. 5 is a diagram illustrating the configuration of a server according to an exemplary embodiment.

FIG. 5 is a diagram illustrating the configuration of a server according to an exemplary embodiment. As illustrated in FIG. 5, the server 300 includes an interface unit 310, a storage unit 320, and a control unit 330.

The interface unit 310 is connected to the broadcast receiving apparatus 100. Further, the interface unit 310 may also be connected to the external device 200.

Specifically, the interface unit 310 may be provided with a network adaptor, and may be connected to the broadcast receiving apparatus 100 and the external device 200 through a network such as the Internet.

The storage unit 320 stores the information transmitted from the broadcast receiving apparatus 100 and the external device 200. In particular, if the information on the broadcast receiving apparatus is converted into an XML form and is transmitted from the broadcast receiving apparatus 100 and the external device 200, the storage unit 320 may store the information converted into the XML form.

The control unit 330 controls the whole operation of the server 300.

Specifically, the control unit 330 may receive the information on the broadcast receiving apparatus 100 from the broadcast receiving apparatus 100 and the external device 200 and may store the received information in the storage unit 320. Here, the information on the broadcast receiving apparatus 100 may include setting information on the broadcast receiving apparatus or user information stored in the broadcast receiving apparatus, or both, and may be converted into an XML form to be received through the interface unit 310.

Further, the control unit 330 may provide a UI for changing the information on the broadcast receiving apparatus.

Specifically, if a command for requesting the change of the information on the broadcast receiving apparatus is received from the broadcast receiving apparatus 100 or the external device 200, the control unit 330 may provide the UI for changing the information on the broadcast receiving apparatus to the broadcast receiving apparatus 100 or the external device 200.

For example, the control unit 300 may provide the UI in the form of a web page through the Internet, and this will be described later with reference to the accompanying FIG. 7.

Then, if the information is changed through the UI, the control unit 330 may store the changed information on the broadcast receiving apparatus in the storage unit 320. Here, the control unit 330 may reflects the changed information in the pre-stored information on the broadcast receiving information and may store the change information in the storage unit 320 in the XML form.

Further, if a command for requesting transmission of the stored information on the broadcast receiving apparatus is received from another broadcast receiving apparatus, the control unit 330 may change the setting information to correspond to the set environment of the other broadcast receiving apparatus and may transmit the changed setting information to the other broadcast receiving apparatus. More detailed description thereof will be made with reference to accompanying FIG. 6.

Figure 6:
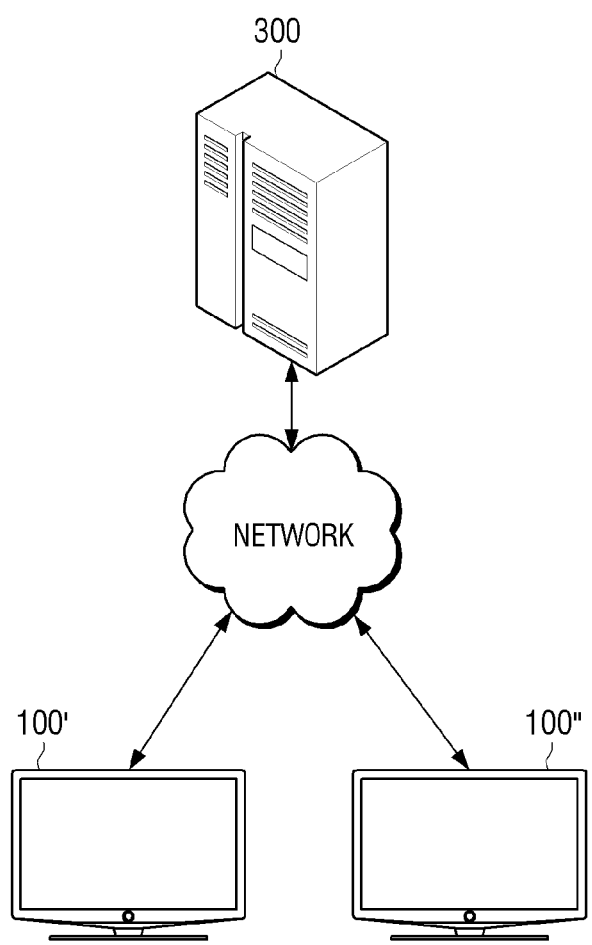
FIG. 6 is a diagram explaining the operation of a server according to an exemplary embodiment.

FIG. 6 is a diagram explaining the operation of the server according to an exemplary embodiment. Particularly, in an exemplary embodiment, it is assumed that the server 300 transmits the stored setting information to another broadcast receiving apparatus 100' according to a request command in a state where the server 300 receives and stores the setting information from the broadcast receiving apparatus 100. That is, it is assumed that another broadcast receiving apparatus 100' intends to apply the setting information on the broadcast receiving apparatus 100.

If the setting information is received from the broadcast receiving apparatus 100, the control unit 330 may request range information on the setting information. For example, if the setting information of "Brightness: 25, Contrast: 50" is received from the broadcast receiving apparatus 100 as the display environment setting information ("Picture"), the control unit 330 may request transmission of range information (for example, 1 to 100) that corresponds to the brightness applied in the broadcast receiving apparatus 100 and range information (for example, 1 to 200) that corresponds to the contrast.

On the other hand, if a command for requesting transmission of the stored setting information is received from another broadcast receiving apparatus 100', the control unit 330 may request transmission of the range information that corresponds to the requested setting information from the other broadcast receiving apparatus 100'.

In this case, if a command for requesting transmission of a part of the stored setting information, the control unit 330 may request transmission of the range information that corresponds to the requested part of the stored setting information from the other broadcast requesting apparatus 100'.

For example, if a command for requesting transmission of the setting information "Brightness" of the display environment setting information is received from the other broadcast receiving apparatus 100', the control unit 330 may request transmission of the range information that corresponds to "Brightness" applied in the other broadcast receiving apparatus 100'.

Thereafter, if the range information that corresponds to the requested setting information is received from the other broadcast receiving apparatus 100', the control unit 330 compares the stored range information of the broadcast receiving apparatus 100 with the received range information of the other broadcast receiving apparatus 100', changes the stored setting information according to the result of the comparison, and transmits the changed setting information to the other broadcast receiving apparatus 100'.

Specifically, the control unit 330 may change the stored setting information of the broadcast receiving apparatus 100 so that the setting information corresponds to the setting environment of the other broadcast receiving apparatus 100', and may transmit the changed setting information to the other broadcast receiving apparatus 100'.

For example, if the range information that corresponds to "Brightness" received from the other broadcast receiving apparatus 100' is 0 to 200, the control unit 330 changes the stored brightness value of the broadcast receiving apparatus 100 from 50 to 100, and transmits the changed brightness value to the other broadcast receiving apparatus 100'. This is because the range information that corresponds to "Brightness" applied in the other broadcast receiving apparatus 100' is 0 to 200, but the range information that corresponds to "Brightness" applied in the broadcast receiving apparatus 100 is 0 to 100.

On the other hand, in the above-described exemplary embodiment, the stored setting information is changed to correspond to the setting environment applied in the other broadcast receiving apparatus 100', and the changed setting information is transmitted to the other broadcast receiving apparatus 100'. However, this is merely exemplary. That is, the control unit 330 may change the stored setting information to a preset default value and may transmit the changed setting information to the other broadcast receiving apparatus 100'.

Further, in the above-described exemplary embodiment, if the setting information is received from the broadcast receiving apparatus 100, the range information for the setting information is requested. However, this is for convenience in explanation, and the range information for the setting information may be received from the broadcast receiving apparatus 100 in diverse ways. That is, the range information for the setting information may be received from the broadcast receiving apparatus 100 together with the setting information. For example, the broadcast receiving apparatus 100 may transmit the range information (for example, 1 to 100) that corresponds to the brightness applied in the broadcast receiving apparatus 100 and the range information (for example, 1 to 200) that corresponds to the contrast together with the setting information of "Brightness: 25, Contrast: 50" as the display environment setting information (Picture).

Further, in the above-described exemplary embodiment, the information on the broadcast receiving apparatus 100 is directly transmitted to another broadcast receiving apparatus 100'. However, this is also merely exemplary. That is, even in the case where the information on the broadcast receiving apparatus 100 is transmitted to another broadcast receiving apparatus 100' through the external device, the above-described exemplary embodiment can be applied.

Figure 7:
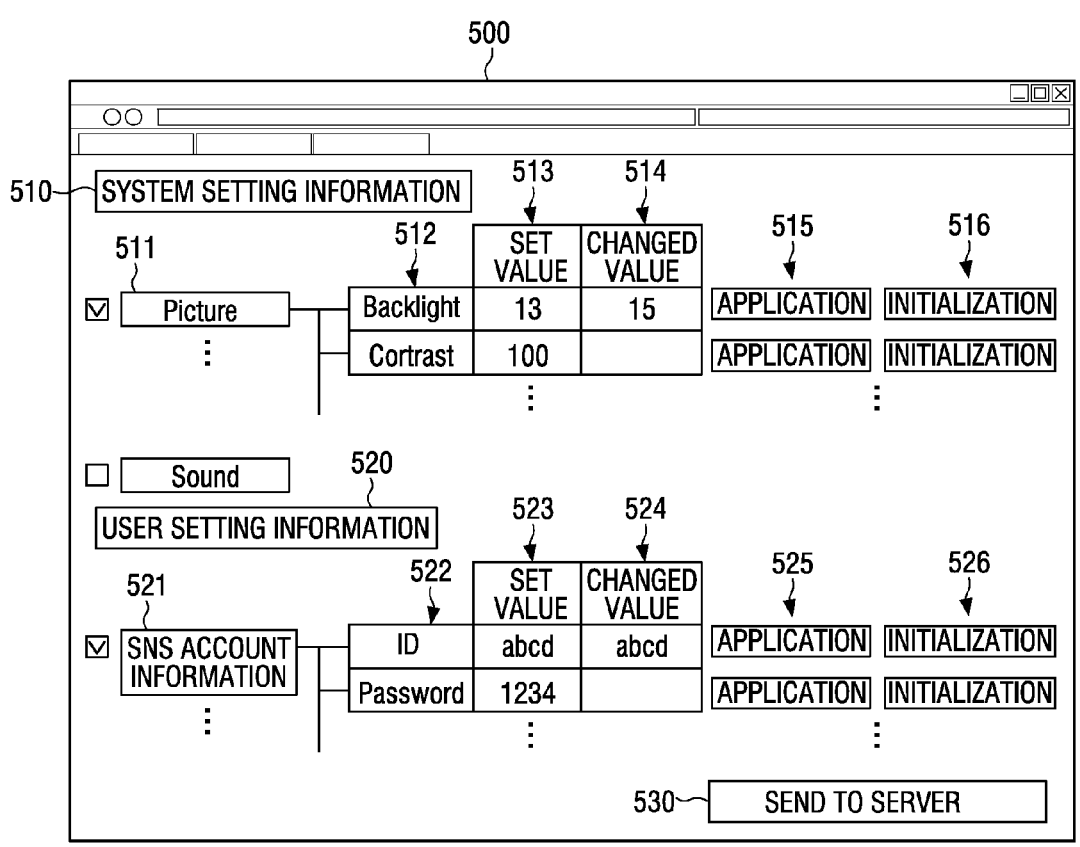
FIG. 7 is a diagram explaining a UI provided by a server according to an exemplary embodiment.

FIG. 7 is a diagram explaining a UI provided by the server according to an exemplary embodiment. In particular, FIG. 7 shows a case where a UI 500 for changing the stored information on the broadcast receiving apparatus is provided in the form of a web page, and according to a request command, the broadcast receiving apparatus 100 and the external device 200 can receive and display the UI 500.

As illustrated in FIG. 7, on the UI 500, a list of system setting information 510 of the broadcast receiving apparatus stored in the server 300 and user setting information 520 is displayed.

If a user directly selects the list through the input unit (not illustrated) provided in the external device 200 or the broadcast receiving apparatus 100 on the UI 500, the information to be changed may be displayed on the UI 500. Thereafter, the user may input the information to be changed on the UI 500 and may transmit the information to the server 300.

For example, as illustrated in FIG. 7, if "Picture" 511 is selected on the system setting information 510, "Backlight", "Contrast", and the like, that are sub-items 512 of the selected Picture, are displayed.

Since the sub-items 512 include a set value display menu 513 for displaying set values pre-stored in the server 300 and a changed value input menu 514 for changing the pre-stored value, the user may determine the set value pre-stored in the server 300 through the set value display menu 513, and may change the pre-stored set value through the changed value input menu 514.

For example, it is assumed that the set value of "Backlight" pre-stored in the server 300 is intended to be changed to "15". In this case, the user can transmit a command for requesting the change of the information pre-stored in the server 300 by inputting "15" on the changed value input menu 514 and sequentially selecting "Application" 515 and "Send to Server" 530.

In the same manner, as illustrated in FIG. 7, if the SNS account information 521 is selected from the user setting information 520, "ID and Password" 522 for the SNS account pre-stored in the server 300 are displayed.

In this case, since a display menu 523 for displaying the set value of the ID and the password pre-stored in the server 300 and a changed value input menu for changing the pre-stored value are displayed, the user can change the pre-stored SNS account information through the corresponding menu.

For example, it is assumed that the ID of the SNS account information pre-stored in the server 300 is intended to be changed to "abce". In this case, the user can transmit a command for requesting the change of the information pre-stored in the server 300 by inputting "15" on the changed value input menu 514 and sequentially selecting "Application" 515 and "Send to Server" 530.

On the other hand, the user may initialize the set values 513 and 523 stored in the server 300 through selection of "Initialization" 516 and 526 provided in the UI 500. In this case, the set values 513 and 523 may be changed to "0" or a preset default value through initialization.

FIGS. 8 to 13 are diagrams illustrating an example of information on the broadcast receiving apparatus according to an exemplary embodiment. In particular, FIGS. 8 to 13 are diagrams illustrating an example of system setting information of information on the broadcast receiving apparatus.

Figure 8:
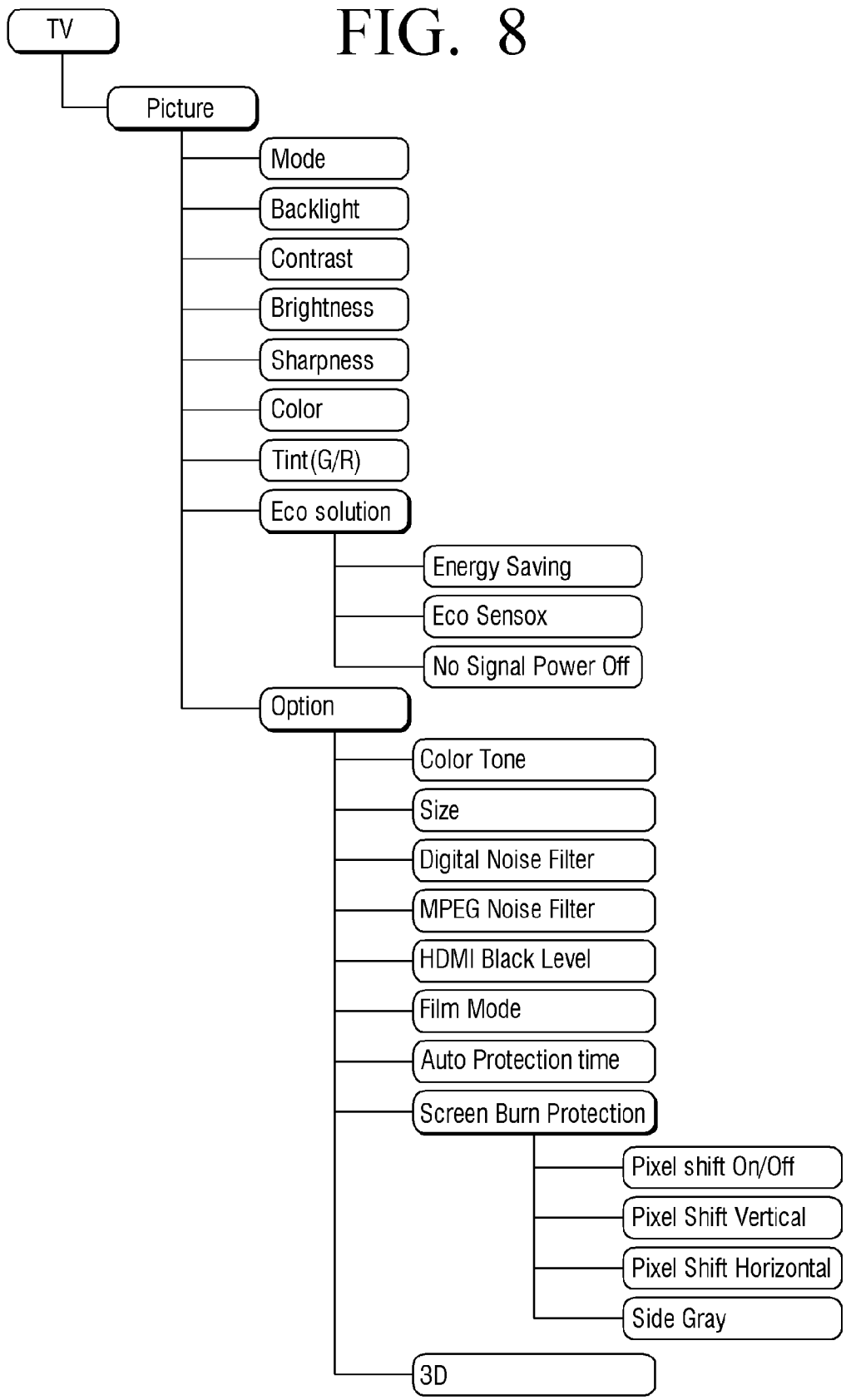
FIGS. 8 to 13 are diagrams illustrating an example of information on a broadcast receiving apparatus according to an exemplary embodiment.
Figure 9:
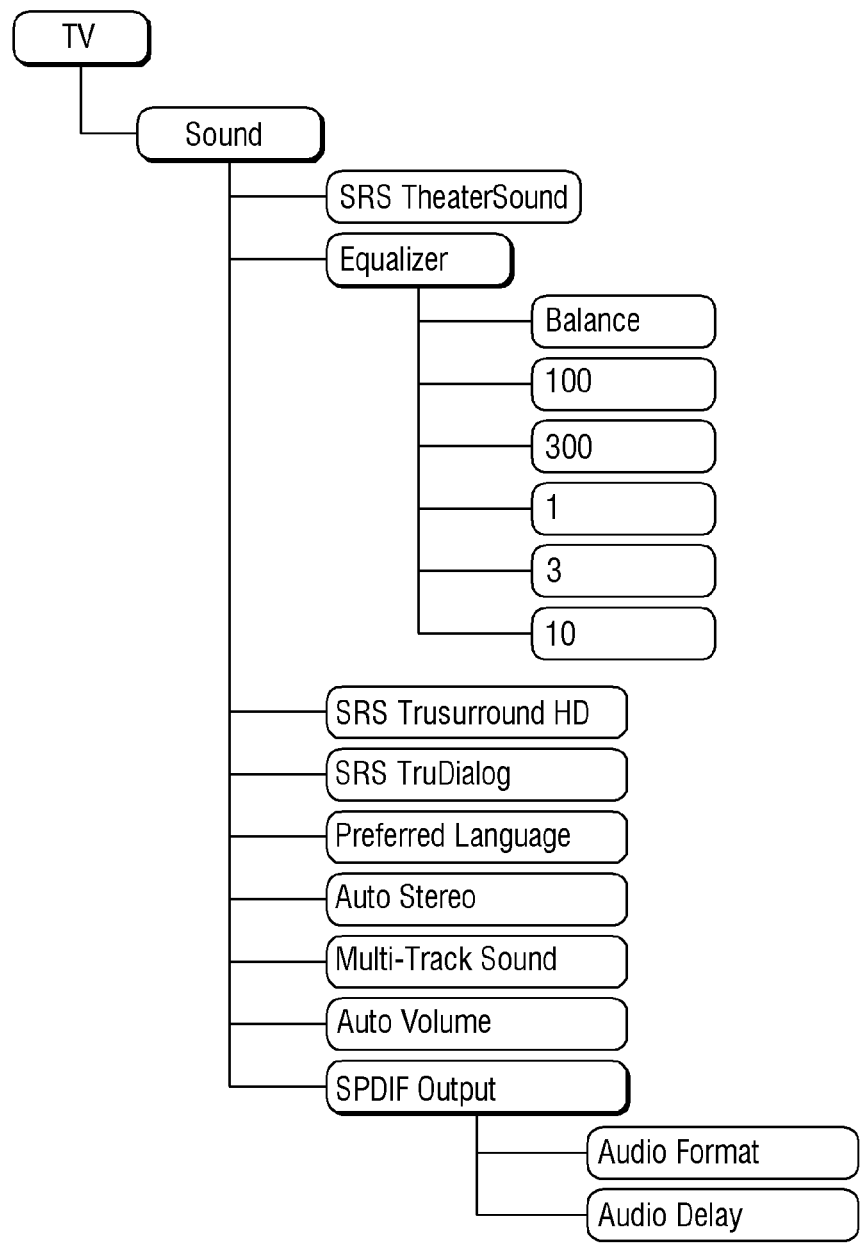
Figure 10:
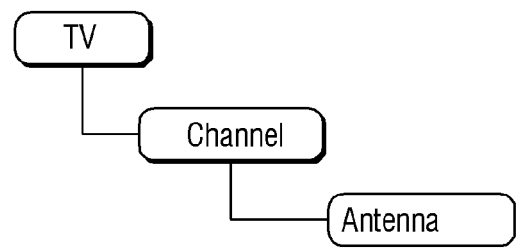
Figure 11:
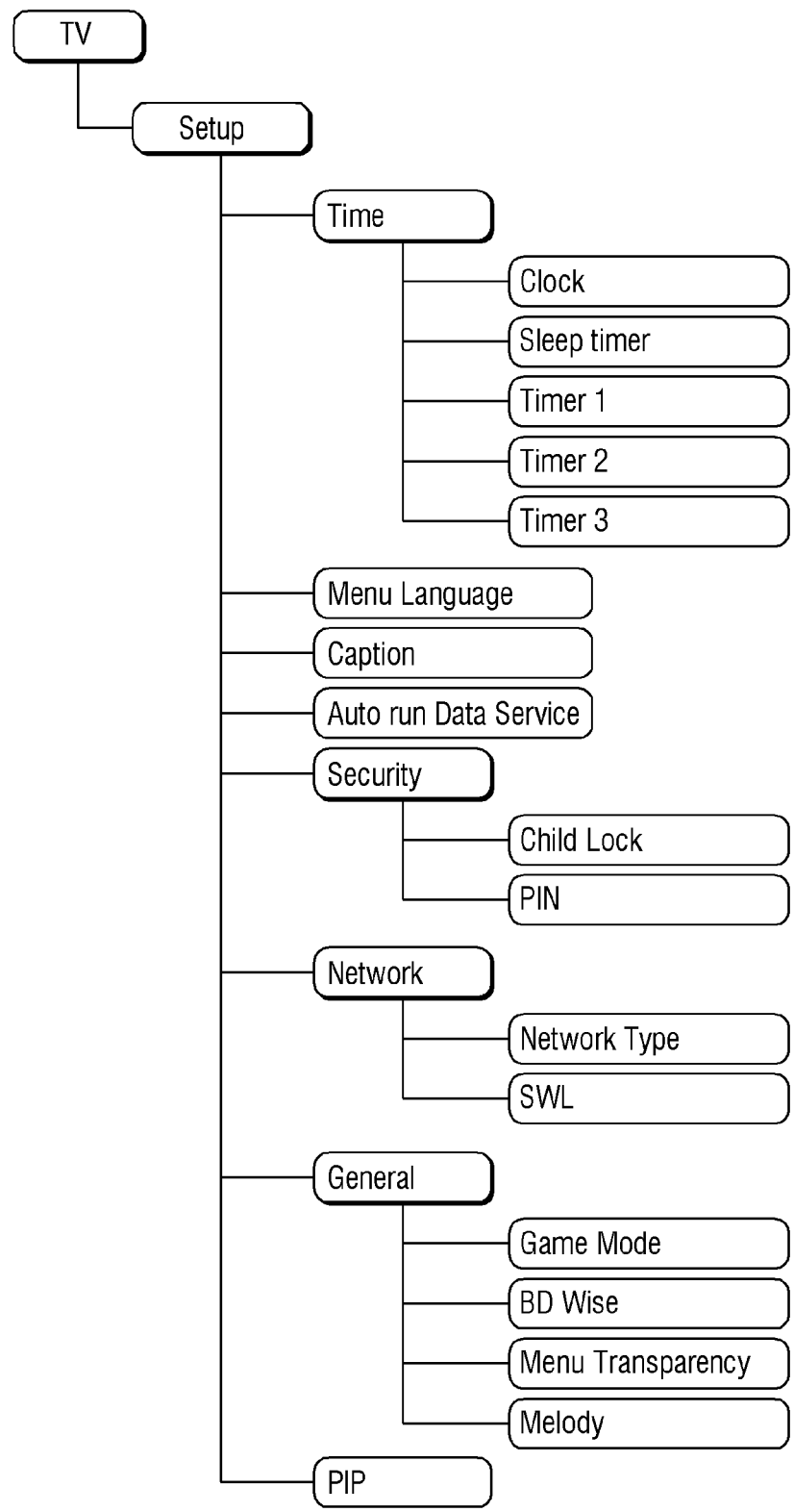
Figure 12:
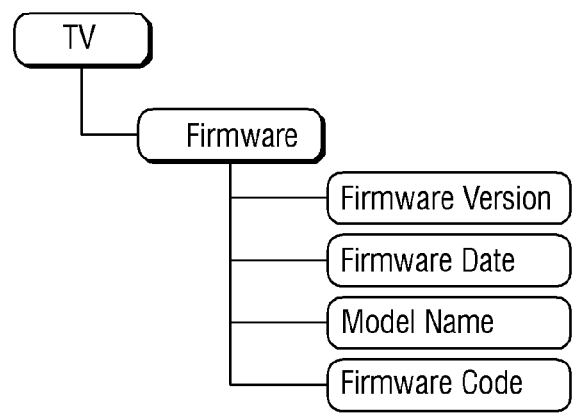
Figure 13:
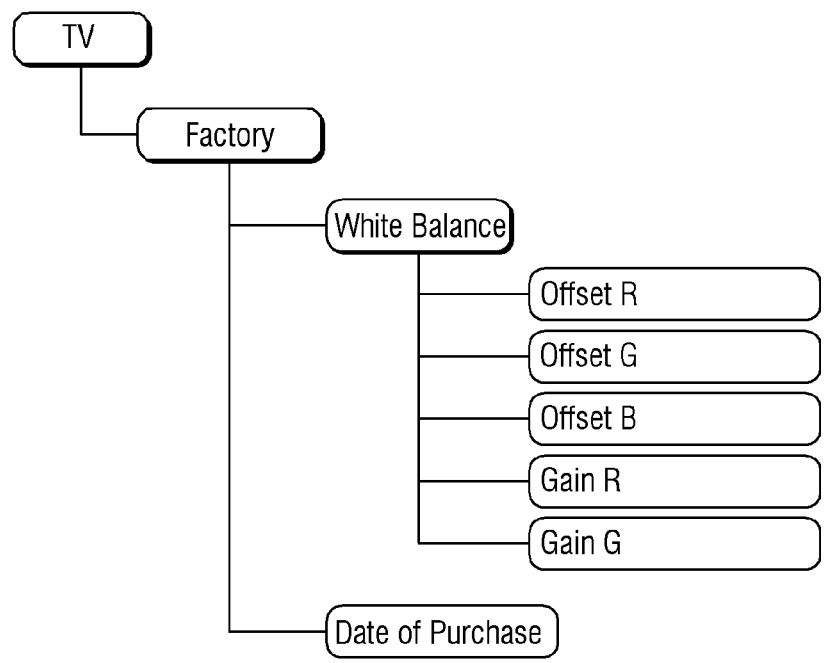

Specifically, FIG. 8 shows sub-items that constitute display screen setting information ("Picture"), FIG. 9 shows sub-items that constitute sound setting information ("Sound"), and FIG. 10 shows sub-items that constitute channel setting information ("Channel"). Further, FIG. 11 shows sub-items that constitute environment setting information ("Setup"), FIG. 12 shows sub-items that constitute firmware information ("Firmware"), and FIG. 13 shows sub-items that constitute factory information ("Factory").

As described above, diverse information applied to the broadcast receiving apparatus may be transmitted to the server 300. However, although the system setting information is exemplified in the above-described exemplary embodiment, this is merely exemplary, and it is also possible to show sub-items of the user setting information in the same manner as those illustrated in FIGS. 8 to 13.

Figure 14:
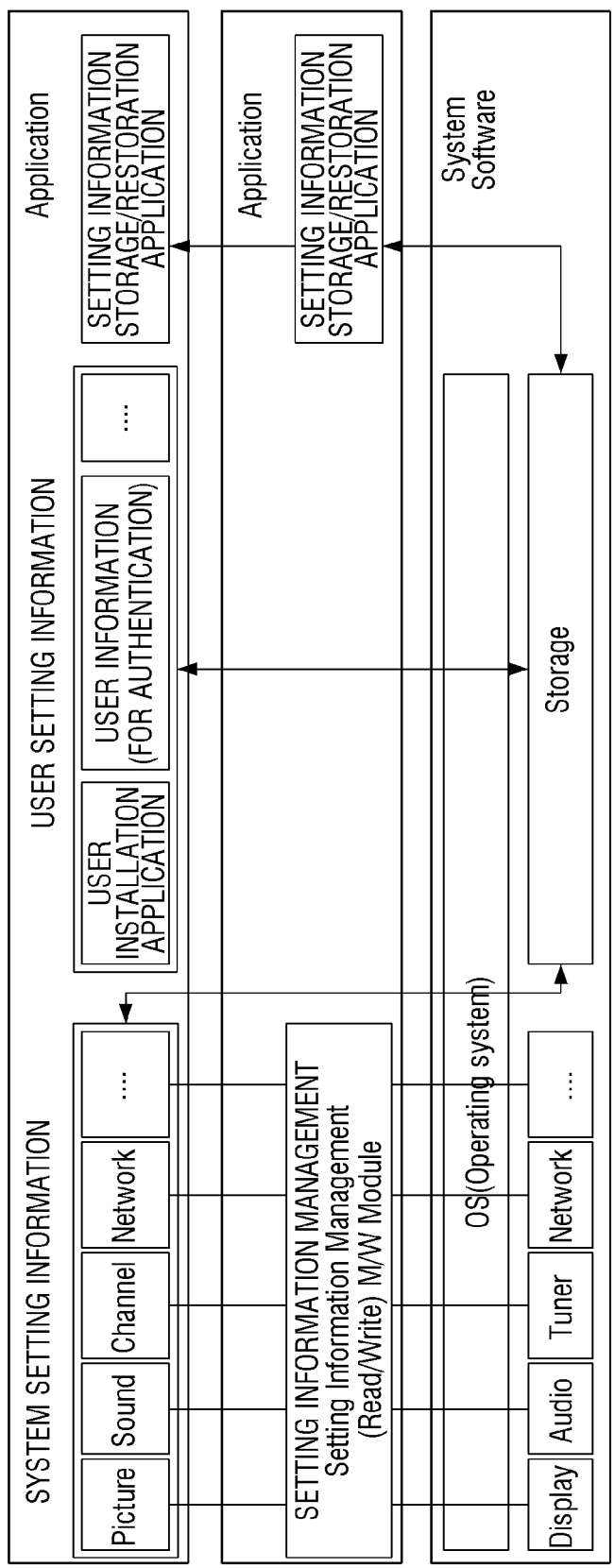
FIG. 14 is a diagram explaining the operation of a broadcast receiving apparatus according to an exemplary embodiment.

FIG. 14 is a diagram explaining the operation of the broadcast receiving apparatus according to an exemplary embodiment. In particular, FIG. 14 shows the software configuration of the broadcast receiving apparatus which transmits the information on the broadcast receiving apparatus that is selected by the user to the server 300 and the external device 200.

Specifically, the system setting information and the user setting information selected by the user are stored in a specified position in the storage unit 120, and the setting information selected through the UI is transmitted to the server 300 or the external device 200 through the interface unit 110 under the control of a setting information storage/restoration application.

On the other hand, the setting information, which is transmitted from the server 300 or the external device 200 according to the user command, may be stored again in the specified position in the storage unit 120 under the control of the setting information storage/restoration application. Further, various kinds of setting information stored in the storage unit 120 may be applied to respective modules by a setting information management Middleware (M/W) module.

Figure 15:
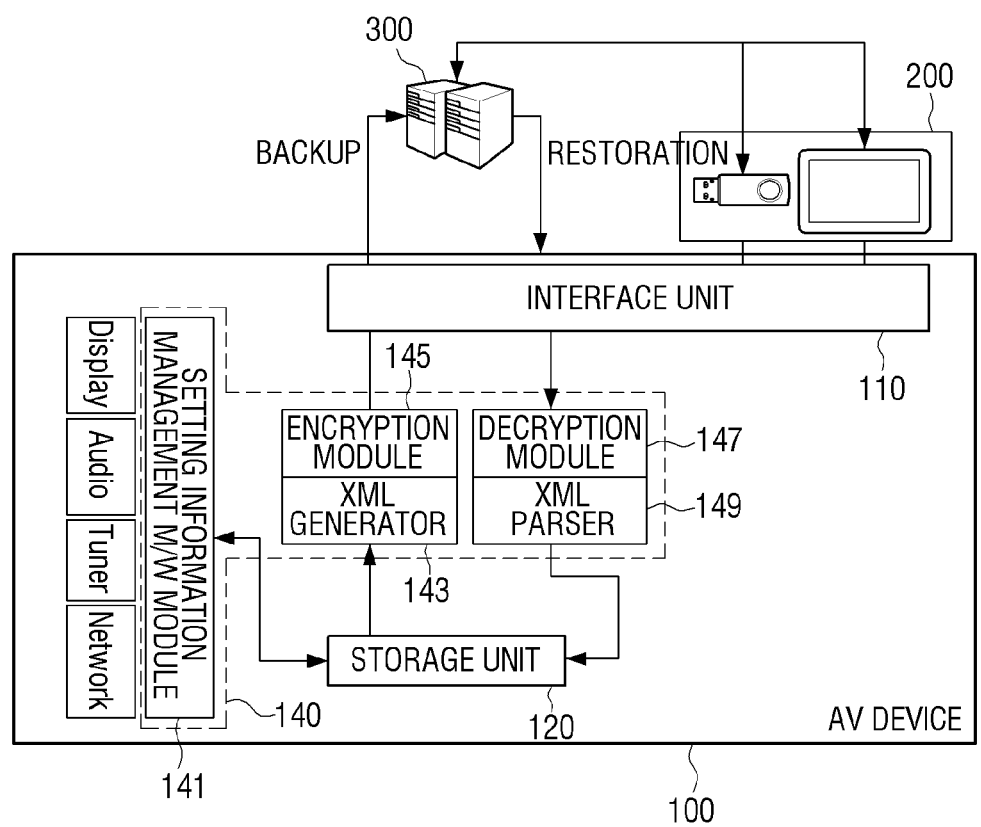
FIG. 15 is a diagram illustrating a system for transmitting and receiving information on a broadcast receiving apparatus according to an exemplary embodiment.

FIG. 15 is a diagram illustrating a system for transmitting and receiving information on the broadcast receiving apparatus according to an exemplary embodiment. In particular, FIG. 15 is a diagram illustrating a method for transmitting and receiving system setting information.

As illustrated in FIG. 15, a setting information management M/W module 141 of the control unit 140 receives the system setting information from the respective modules that constitute the broadcast receiving apparatus 100 and stores the received system setting information in the storage unit 120.

If a user command for transferring the system setting information to the server 300 or the external device 200, an XML generator 143 converts the system setting information pre-stored in the storage unit 120 into an XML form. The system setting information converted into the XML form may be encrypted by an encryption module 145, and may be transmitted to the external device 200 or the server 300 through the interface unit 110 to be backed up.

On the other hand, the system setting information backed up according to the user command may be restored by the broadcast receiving apparatus 100. Specifically, if the system setting information is received from the external device 200 or the server 300 through the interface unit 110, a decryption module 147 may decrypt the encrypted system setting information, and an XML parser 149 may restore the system setting information that has converted into the XML form to the original state through parsing the decrypted system setting information. Thereafter, the system setting information may be stored in the storage unit 120, and may be applied to the respective modules by the setting information management M/W module 141.

In the above-described exemplary embodiment, the system setting information is encrypted and transmitted in the XML form. However, this is merely exemplary, and the system setting information in the XML form may be transmitted to the external device 200 or the server 300 without any separate encryption. In this case, the encryption module 145 and the decryption module 147 in FIG. 15 may be omitted.

On the other hand, the system setting information transferred to the external device 200 may be transmitted to the server 300 through a network or a specified application.

For example, if the external device 200 is a mobile terminal that supports wireless communication, it can transmit the system setting information to the server 300 through a network such as the Internet. In another example, if the external device 200 is implemented by a USB memory, the server 300 may be provided with a USB port for connecting to the USB memory.

Further, the server 300 may receive and store the system setting information from the external device 200 through driving of a setting information management application, and may re-transmit the system setting information to the broadcast receiving apparatus 100 or the external device 200.

On the other hand, in the above-described exemplary embodiment, the system setting information has been described. However, this is for convenience in explanation, and the above-described features may also be applied to the user setting information.

Figure 16:
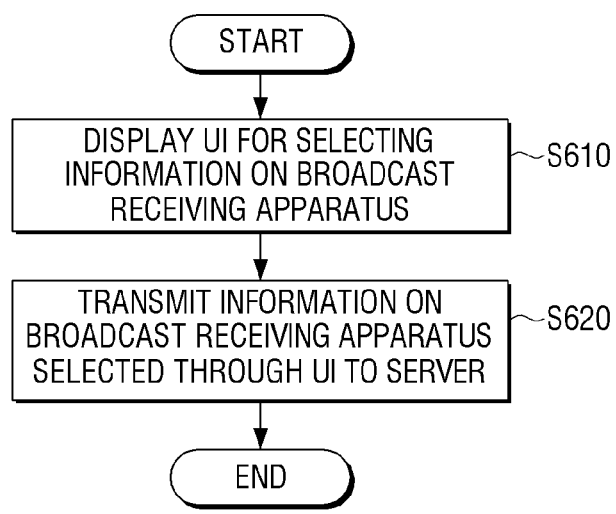
FIG. 16 is a flowchart illustrating a method for controlling a broadcast receiving apparatus that is connected to a server according to an exemplary embodiment.

FIG. 16 is a flowchart illustrating a method for controlling the broadcast receiving apparatus that is connected to the server according to an exemplary embodiment.

First, a UI for selecting the information on the broadcast receiving apparatus is displayed (S610). Here, the information on the broadcast receiving apparatus may include setting information of the broadcast receiving apparatus or user information stored in the broadcast receiving apparatus, or both.

Thereafter, the information on the broadcast receiving apparatus selected through the UI is transmitted to the server (S620). In this case, the selected information on the broadcast receiving apparatus may be converted into the XML form to be transmitted to the server, and may be encrypted with a predetermined key to be transmitted to the server.

On the other hand, the broadcast receiving apparatus may be connected to the external device, and may transmit the selected information on the broadcast receiving apparatus to the external device connected to the server.

On the other hand, according to an exemplary embodiment, the broadcast receiving apparatus may transmit a command for requesting the information on the broadcast receiving apparatus to the server, and may receive and store the information on the broadcast receiving apparatus from the server in response to the request command.

Since the respective exemplary embodiments thereof have been described, duplicate explanation and illustration thereof will be omitted.

FIG. 17 is a flowchart illustrating a method for controlling the server that is connected to the broadcast receiving apparatus according to an exemplary embodiment.

First, the information on the broadcast receiving apparatus that is transmitted from the broadcast receiving apparatus is received (S710). In this case, the information on the broadcast receiving apparatus that is expressed in an XML form may be received and stored.

Thereafter, the UI for changing the information on the broadcast receiving apparatus is provided to the broadcast receiving apparatus, and if the information on the broadcast receiving apparatus is changed on the UI, the changed information on the broadcast receiving apparatus is stored (S720).

On the other hand, the information on the broadcast receiving apparatus includes the setting information of the broadcast receiving apparatus. Further, a command for requesting transmission of the information on the broadcast receiving apparatus that is stored from another broadcast receiving apparatus may be received, the setting information may be changed to correspond to the setting environment of the other broadcast receiving apparatus, and the changed setting information may be transmitted to the other broadcast receiving apparatus.

On the other hand, a program for performing the method according to diverse exemplary embodiments may be stored in diverse types of recording media to be used.

Specifically, a code for performing the above-described methods may be stored in diverse types of recording media that can be read by a terminal, such as a Random Access Memory (RAM), a flash memory, a Read Only Memory (ROM), an Erasable Programmable ROM (EPROM), an Electronically Erasable and Programmable ROM (EEPROM), a register, a hard disk drive, a removable disk, a memory card, a USB memory, and a CD-ROM.

While the invention has been shown and described with reference to certain exemplary embodiments thereof, it will be understood by those skilled in the art that various changes in form and detail may be made therein without departing from the spirit and scope of the invention, as defined by the appended claims.

What is claimed is:

1. A broadcast receiving apparatus comprising:
an interface communicatively connected to an external device;
a storage which stores setting information on the broadcast receiving apparatus;
a display; and
a controller which controls the display to display a user interface, the user interface comprising a plurality of information types for selecting at least one information type among the plurality of information types to be transferred to the external device, and controls to transfer setting information on the broadcast receiving apparatus corresponding to the at least one information type selected through the user interface, to the external device via the interface,
wherein the controller transmits a command for requesting setting information on another broadcast receiving apparatus to a server through the interface, receives and stores the setting information on the other broadcast receiving apparatus from the server in response to the request command,
wherein the controller transmits information on a set environment of the broadcast receiving apparatus to the server and receives, from the server, the setting information on the other broadcast receiving apparatus that is adjusted according to the set environment of the broadcast receiving apparatus, and
wherein the controller is implemented in a hardware processor.

2. The broadcast receiving apparatus as claimed in claim 1, wherein the setting information on the broadcast receiving apparatus further comprises user information stored in the broadcast receiving apparatus.

3. The broadcast receiving apparatus as claimed in claim 1, wherein the controller converts the setting information on the broadcast receiving apparatus corresponding to the at least one selected information type into an Extensible Markup Language (XML) form to transmit the converted setting information to a server that is communicatively connected to the interface.

4. The broadcast receiving apparatus as claimed in claim 1, wherein the controller transmits the setting information of the broadcast receiving apparatus corresponding to the at least one selected information type to the external device that is communicating with a server through the interface to transmit the selected setting information on the broadcast receiving apparatus to the server.

5. The broadcast receiving apparatus as claimed in claim 1, wherein the controller encrypts the setting information on the broadcast receiving apparatus corresponding to the at least one selected information type with a key and transmits the encrypted information to a server that is communicatively connected to the interface.

6. The broadcast receiving apparatus as claimed in claim 1, wherein the plurality of information types comprise at least one of a picture, sound, a channel, and a network.

7. The broadcast receiving apparatus as claimed in claim 1, wherein the user interface comprises a menu item for transmitting the setting information on the broadcasting receiving apparatus corresponding to the at least one selected information type to the external apparatus, and
the controller, in response to an input from the menu item, controls to transfer the setting information on the broadcast receiving apparatus corresponding to the selected information type.

8. The broadcast receiving apparatus as claimed in claim 1, wherein the information on the set environment comprises information about a range of a value of at least one setting item that is applied in the broadcast receiving apparatus.

9. The broadcast receiving apparatus as claimed in claim 8, wherein the setting information on the other broadcast receiving apparatus is further adjusted according to a comparison between the range of the value of the at least one setting item that is applied in the broadcast receiving apparatus and a range of a value of the at least one setting item that is applied in the other broadcast receiving apparatus.

10. A server comprising:
an interface communicatively connected to a broadcast receiving apparatus;
a storage unit storing setting information on the broadcast receiving apparatus that is transmitted from the broadcast receiving apparatus; and
a controller controlling a display of the broadcast receiving apparatus to display a user interface, the user interface comprising a plurality of information types for selecting at least one information type among the plurality of information types, and controlling to store setting information on the broadcast receiving apparatus corresponding to the at least one information type selected through the user interface, to the external device via the interface,
wherein the controller changes the setting information to correspond to a set environment of another broadcast receiving apparatus and transmits the changed setting information to the other broadcast receiving apparatus in response to a command for requesting transmission of the stored information on the broadcast receiving apparatus being received from the other broadcast receiving apparatus, and
wherein the controller is implemented in a hardware processor.

11. The server as claimed in claim 10, wherein the controller receives and stores the setting information on the broadcast receiving apparatus that is in an Extensible Markup Language (XML) form through the interface.

12. A method for controlling a broadcast receiving apparatus that communicates with an external device, the method comprising:
displaying a User Interface (UI), the user interface comprising a plurality of information types for selecting at least one information type among the plurality of information types to be transferred to the external device;
transmitting setting information on the broadcast receiving apparatus corresponding to the at least one information type selected through the UI, to the external device; and
transmitting a command for requesting setting information on another broadcast receiving apparatus to a server through the interface;
receiving and storing the setting information on the other broadcast receiving apparatus from the server in response to the request command,
wherein the transmitting the command comprises transmitting information on a set environment of the broadcast receiving apparatus to the server, and the received setting information on the other broadcast receiving apparatus comprises setting information on the other broadcast receiving apparatus that is adjusted according to the set environment of the broadcast receiving apparatus.

13. The method for controlling a broadcast receiving apparatus as claimed in claim 12, wherein the setting information on the broadcast receiving apparatus further comprises user information stored in the broadcast receiving apparatus.

14. The method for controlling a broadcast receiving apparatus as claimed in claim 12, wherein the transmitting the setting information to the external device converts the setting information on the broadcast receiving apparatus corresponding to the at least one selected information type into an Extensible Markup Language (XML) form to transmit the converted setting information to the external device.

15. The method for controlling a broadcast receiving apparatus as claimed in claim 12, wherein the method for controlling a broadcast receiving apparatus further comprises transmitting the setting information of the broadcast receiving apparatus corresponding to the at least one selected information type to the external device that is communicating with a server to transmit the setting information on the broadcast receiving apparatus to the server.

16. The method for controlling a broadcast receiving apparatus as claimed in claim 12, further comprising:
encrypting the setting information on the broadcast receiving apparatus corresponding to the at least one selected information type with a key and transmitting the encrypted information to a server.

* * * * *